United States Patent [19]
Wargotz et al.

[11] 3,852,518
[45] Dec. 3, 1974

[54] IRRADIATION CROSS-LINKED COMPOSITE LOW DENSITY/HIGH DENSITY POLYETHYLENE INSULATED 600 VOLT POWER CABLES

[75] Inventors: Bernard Wargotz, Middletown; David A. Silver, Livingston, both of N.J.

[73] Assignee: General Cable Corporation, Greenwich, Conn.

[22] Filed: Nov. 29, 1973

[21] Appl. No.: 419,949

[52] U.S. Cl. .... 174/120 SR, 117/232, 174/110 PM, 174/120 R
[51] Int. Cl. ............................................ H01b 7/28
[58] Field of Search ... 174/120 R, 120 SR, 110 PM; 117/232

[56] References Cited
FOREIGN PATENTS OR APPLICATIONS
860,811  2/1961  Great Britain ............... 174/110 PM

OTHER PUBLICATIONS

Blodgett et al. "Insulations & Jackets For Crosslined Polyethylene Cables," IEEE Transactions on Power Apparatus & System, No. 69, Dec., 1963, pp. 971–979.

Malnati, "Radiation Cross Linking of PUC & PE Wire Insulation" in Wire & Wire Products, Oct., 1971, p. 118.

*Primary Examiner*—E. A. Goldberg

[57] ABSTRACT

This underground power and service entrance cable is insulated with two layers of polyethylene insulation, the inner layer being low density polyethylene and the outer layer being high density polyethylene with the layers fused together and cross-linked. The insulation is thus a thermoset construction. It provides a cable with insulation which is mechanically stronger, of more economical design, thermoset throughout its full thickness and of superior stability in water; the latter being an advantage when used underground.

8 Claims, 2 Drawing Figures

IRRADIATION STATION

EXTRUSION STATION

3,852,518

IRRADIATION CROSS-LINKED COMPOSITE LOW DENSITY/HIGH DENSITY POLYETHYLENE INSULATED 600 VOLT POWER CABLES

BACKGROUND AND SUMMARY OF THE INVENTION

This invention is for 600 volt underground power and service entrance cable. Conventional 600 volt power cable employs chemically cross-linked low density polyethylene insulation. Whereas, chemically cross-linked polyethylene possesses excellent electrical stability in water, the performance with this cable design has been unsatisfactory due to the poor resistance of the insulation to mechanical damage during installation and in service.

High density polyethylene, which is a tough abrasion and score resistant material, does not lend itself to chemical cross-linking and is hence, a thermoplastic material which softens with increasing temperature. It is not suitable for use in underground installations because of its poor electrical stability in water.

This patent application describes a product which combines both materials in a composite structure and hence, utilizes the outstanding features of each material. The inner layer of low density polyethylene provides the electrical stability in water required for underground installations, whereas, the outer layer of high density polyethylene provides the resistance to mechanical damage required for installation underground and, particularly for direct earth burial.

Cross-linking of the composite structure through irradiation renders both materials thermosetting and hence, capable of operating at higher temperatures under normal, overload and abnormal operating conditions. Cross-linking of the outer layer through irradiation also improves its electrical stability in water and thus, improves the electrical stability in water of the composite structure. A bond between the two layers enhances the cable's resistance to mechanical damage.

The cross-linking of the overcoat is an electron irradiation cross-linking or equivalent, in contrast with chemical cross-linking. The inner layer of insulation is cross-linked at the same time as the outer layer; and all of the polyethylene is thermoset as a result of the irradiation.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
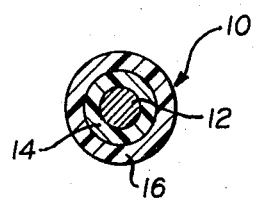
FIG. 1 is a cross-section of a cable made in accordance with this invention.

FIG. 1 shows a cable 10 having a conductor core 12 and an inner layer of low density polyethylene insulation 14 covered by an overcoat of a second layer of polyethylene 16 which is of high density. For purposes of this invention low density polyethylene is from about 0.910 to about 0.940 grams per cubic centimeter; and preferably from about 0.910 to 0.925 grams per cubic centimeter, the lower range having somewhat better electrical characteristics. High density polyethylene is from about 0.941 to about 0.965 grams per cubic centimeter and it has somewhat inferior electrical characteristics as compared to the lower density polyethylene.

The 600 volt underground power and service entrance cable to which this invention relates has a conductor 12 of size of 1000 Kcmil and smaller. The conductor 12 may be a solid conductor or may be stranded.

The inner insulation 14 is preferably in direct contact with the outside of the conductor 12. The outer insulation 16 is firmly secured to the inner insulation layer 14, preferably by fusion. One of the advantages of having the inner layer 14 and the outer layer 16 both made of polyethylene is that the polyethylene of these two layers will fuse together more effectively than if the outer layer were made of some tougher material different from polyethylene and which, because of a dissimilar interface would have poor adhesion of one layer to the other.

The insulation is cross-linked so that it is thermoset throughout its full thickness. This is preferably done by electron irradiation which simultaneously cross-links both layers 14 and 16 of the insulation. Electron irradiation is used to cross-link and thermoset the insulation in contrast to chemical cross-linking which would leave a residue of chemical cross-linking ingredients in the layer which was cross-linked or in both layers as if chemical cross-linking were used in both layers.

The thermoset polyethylene of the inner layer 14 can withstand much higher temperatures than polyethylene which is not cross-linked and this greatly increases the carrying capacity of the cable without damage to the insulation as the result of overheating. The cross-linking of the overcoat or outer layer 16 raises its softening temperature but more importantly it not only makes the outer layer tougher for providing mechanical protection but also gives the outer layer 16 superior electrical stability in water and in high humidity environment to which underground installations are often exposed.

The combined thickness of the two layers of insulation 14 and 16 is ordinarily between about 47 mils and 110 mils for the size of wire used for 600 volt underground power and service entrance cables. The inner and outer layer will normally be not less than 30 mils. The outer layer may be less, equal, or greater in thickness than the inner layer.

The ratio of the radial thickness of the layers 14 and 16 to one another is not critical. Since the purpose in using the overcoat layer 16 is to provide mechanical protection to the insulation, it is necessary to have this outer layer 16 thick enough to provide the required protection. Wires made in accordance with this invention have been constructed with the radial thickness of the inner layer 14 equal to that of the outer layer 16; but where the total thickness of insulation is in the upper range of thickness, the outer layer 16 can be somewhat thinner than the inner layer 14 and still provide adequate protection for the insulation. A greater thickness for the inner layer 14, when practical, is that the cost of insulation is lower and the electrical characteristics of the insulation are better.

Figure 2:
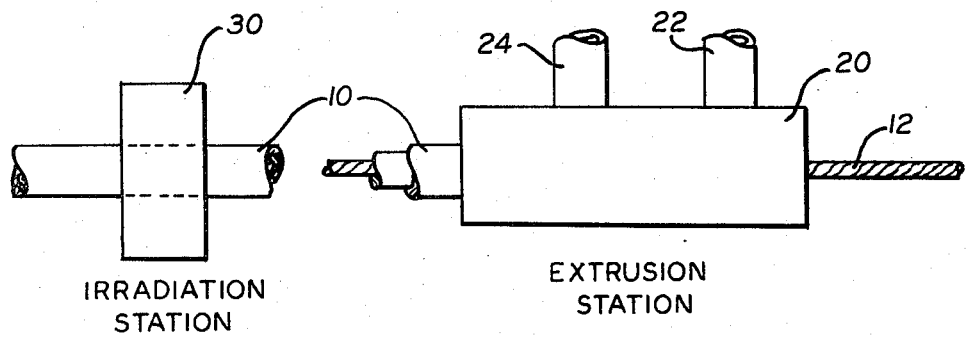
FIG. 2 is a diagrammatic view showing apparatus for making the cable shown in FIG. 1.

FIG. 2 illustrates the method of making the cable shown in FIG. 1, the conductor 12 is advanced through an extruder 20 at an extrusion station. Material for the inner layer 14 is fed into the extruder through a passage 22; and material for the outer layer 16 is fed into the extruder through a second passage 24. These layers can be extruded simultaneously one over the other and apparatus for such extruding is well known and no illustration of its detailed construction is necessary for the complete understanding of this invention.

The inner and outer layers 14 and 16, respectively, can be extruded by tandem extrusion, but in such a case the extruders are preferably placed close enough together so that the material extruded for the first layer is still molten when the polyethylene of the second layer is extruded over it. This obtains a bond which is a true fusion bond and obtains much better adhesion than is obtained with the second layer extruded over an already hardened first layer. Bonding of the two layers can also be accomplished through a double pass through the extrusion.

Beyond the extruder station, the cable 10 passes through an electron irradiation device 30 which subjects the insulation on the cable 10 to irradiation in sufficient dosage to thermoset the polyethylene of the insulation.

The preferred embodiment of the invention has been illustrated and described, but changes and modifications can be made, and some features can be used in different combinations without departing from the invention as defined in the claims.

What is claimed is:

1. A power cable comprising a conductor core, a composite insulation surrounding the core and comprising an inner layer of insulation made of cross-linked low density polyethylene, and an outer insulation applied over the inner insulation to give the cable improved impact, score and abrasion resistance, the outer insulation being cross-linked high density polyethylene.

2. The power cable described in claim 1 characterized by the inner insulation being in direct contact with a conductor comprising the core of the cable, and the high and low density polyethylene being fused together.

3. The power cable described in claim 1 characterized by the polyethylene of the insulation being thermoset as a result of cross-linking.

4. The power cable described in claim 1 characterized by the inner layer of the polyethylene insulation having better electrical and electrical stability in water characteristics than the outer layer.

5. The power cable described in claim 1 characterized by the cable being a 600 volt underground and service entrance cable with the outer layer of superior electrical stability in water as a result of the cross-linking of the outer layer.

6. The underground and service entrance cable described in claim 5 characterized by the insulation being free of chemical cross-linking ingredients and having irradiation induced cross-linking to increase the resistance of the high density polyethylene, to stress cracking.

7. The power cable described in claim 1 characterized by the inner layer of polyethylene having a density of about 0.910 – 0.940 grams per cubic centimeter, and the outer layer having a density of about 0.941 – 0.965 grams per cubic centimeter.

8. The power cable described in claim 2 characterized by the conductor being of a size of 1,000 kcmil and smaller, and the combined thickness of the high density and low density polyethylene layers being between about three sixty-fourths to six sixty-fourths inches.

* * * * *